US008140654B2

(12) United States Patent
Sultan et al.

(10) Patent No.: US 8,140,654 B2
(45) Date of Patent: Mar. 20, 2012

(54) VERIFYING MANAGEMENT VIRTUAL LOCAL AREA NETWORK IDENTIFIER PROVISIONING CONSISTENCY

(75) Inventors: Robert Sultan, Somers, NY (US); Linda Dunbar, Plano, TX (US); Lucy Yong, Tulsa, OK (US); T. Benjamin Mack-Crane, Downers Grove, IL (US)

(73) Assignee: Futurewei Technologies, Inc., Plano, TX (US)

( * ) Notice: Subject to any disclaimer, the term of this patent is extended or adjusted under 35 U.S.C. 154(b) by 574 days.

(21) Appl. No.: 12/057,566

(22) Filed: Mar. 28, 2008

(65) Prior Publication Data

US 2008/0270588 A1  Oct. 30, 2008

Related U.S. Application Data

(60) Provisional application No. 60/914,432, filed on Apr. 27, 2007, provisional application No. 60/970,428, filed on Sep. 6, 2007, provisional application No. 61/016,332, filed on Dec. 21, 2007.

(51) Int. Cl.
*G06F 15/16* (2006.01)
(52) U.S. Cl. .................. 709/223; 709/201; 709/208
(58) Field of Classification Search .................. 709/223
See application file for complete search history.

(56) References Cited

U.S. PATENT DOCUMENTS

| | | | |
|---|---|---|---|
| 5,781,716 A | 7/1998 | Hemphill et al. | |
| 6,301,239 B1 | 10/2001 | Chuprun et al. | |
| 6,636,499 B1 * | 10/2003 | Dowling | 370/338 |
| 6,789,121 B2 * | 9/2004 | Lamberton et al. | 709/227 |
| 7,151,773 B1 | 12/2006 | Mo et al. | |
| 7,269,657 B1 * | 9/2007 | Alexander et al. | 709/229 |
| 7,281,030 B1 * | 10/2007 | Davis | 709/212 |
| 7,284,047 B2 * | 10/2007 | Barham et al. | 709/224 |
| 7,301,949 B2 | 11/2007 | Eriksson | |
| 7,512,139 B2 * | 3/2009 | Wong et al. | 370/401 |
| 7,606,143 B2 | 10/2009 | Cooley et al. | |
| 7,706,362 B1 | 4/2010 | Senthilnathan et al. | |
| 2002/0001302 A1 | 1/2002 | Pickett | |

(Continued)

FOREIGN PATENT DOCUMENTS

CN  1571377  1/2005

(Continued)

OTHER PUBLICATIONS

IEEE P802.1AB/D13, Dec. 2004, Station and Media Access Control Connectivity Discovery.*

(Continued)

*Primary Examiner* — Firmin Backer
*Assistant Examiner* — Keyvan Emdadi
(74) *Attorney, Agent, or Firm* — Conley Rose, P.C.; Grant Randolph

(57) ABSTRACT

A communications network, comprising a plurality of nodes supporting connection-oriented traffic and connectionless traffic, wherein management traffic between the nodes is propagated as connectionless traffic having a unique management traffic Virtual Local Area Network (VLAN) identifier (VID), and wherein at least one node is configured to perform a Link Layer Discovery Protocol (LLDP) exchange operation to enable detection of inconsistent provisioning of the Management VID in at least one node. Also disclosed is a communications network component, comprising logic that enables connection-oriented traffic and VLAN-based connectionless traffic, wherein the logic propagates management messages as VLAN-based connectionless traffic having a management VID, and wherein the logic enables detection of inconsistent management VIDs in a network.

23 Claims, 5 Drawing Sheets

U.S. PATENT DOCUMENTS

| | | | |
|---|---|---|---|
| 2003/0217137 A1* | 11/2003 | Roese et al. | 709/223 |
| 2003/0217150 A1* | 11/2003 | Roese et al. | 709/225 |
| 2004/0044754 A1* | 3/2004 | Virdy et al. | 709/223 |
| 2004/0218542 A1 | 11/2004 | Lee | |
| 2004/0255154 A1 | 12/2004 | Kwan et al. | |
| 2005/0013297 A1 | 1/2005 | Eriksson | |
| 2005/0018612 A1 | 1/2005 | Fitzgerald | |
| 2005/0060414 A1* | 3/2005 | Phillips et al. | 709/227 |
| 2005/0064906 A1 | 3/2005 | Metzler et al. | |
| 2005/0071446 A1* | 3/2005 | Graham et al. | 709/223 |
| 2005/0097206 A1 | 5/2005 | Rabinovitch et al. | |
| 2005/0108401 A1 | 5/2005 | Gonda | |
| 2005/0220096 A1 | 10/2005 | Friskney et al. | |
| 2006/0034292 A1 | 2/2006 | Wakayama et al. | |
| 2007/0086455 A1* | 4/2007 | Allan et al. | 370/389 |
| 2007/0133397 A1 | 6/2007 | Bianchi et al. | |
| 2007/0133549 A1* | 6/2007 | Lee et al. | 370/392 |
| 2007/0263660 A1 | 11/2007 | Mitsumori | |
| 2008/0040486 A1* | 2/2008 | Kezys et al. | 709/227 |
| 2008/0049621 A1* | 2/2008 | McGuire et al. | 370/236.2 |
| 2008/0065775 A1* | 3/2008 | Polk | 709/228 |
| 2008/0107027 A1 | 5/2008 | Allan et al. | |
| 2008/0112331 A1 | 5/2008 | Long et al. | |
| 2008/0155094 A1* | 6/2008 | Roese et al. | 709/224 |
| 2008/0253299 A1 | 10/2008 | Damm et al. | |
| 2008/0270588 A1* | 10/2008 | Sultan et al. | 709/223 |
| 2008/0291922 A1 | 11/2008 | Sultan et al. | |
| 2009/0003313 A1* | 1/2009 | Busch et al. | 370/352 |
| 2010/0042668 A1* | 2/2010 | Liang et al. | 709/201 |

FOREIGN PATENT DOCUMENTS

| | | |
|---|---|---|
| CN | 1728658 | 2/2006 |
| CN | 1741480 | 3/2006 |
| CN | 1823505 | 8/2006 |
| CN | 101179479 | 5/2008 |
| WO | 9856140 | 12/1998 |

OTHER PUBLICATIONS

Bottorf, Paul, et al., "Provider Backbone Transport Overview", http://www.ieee802.org/1/files/public/docs2006/new-bottorff-pbt-overview-1006-01.pdf, Nov. 26, 2006, 5 pages.

Vissers, Maarten, "CFM in PBB-TE", http://www.ieee802.org/1/files/public/docs2007/new-vissers-cfm-in-pbb-te-0307.pdf, Mar. 2007, 18 pages.

IEEE Standard, 802.1AB™, "IEEE Standard for Local and Metropolitan Area Networks, Station and Media Access Control Connectivity Discovery", IEEE Computer Society, May 6, 2005, 172 pages.

IEEE Standard, 802.1ad™, "IEEE Standard for Local and Metropolitan Area Networks, Virtual Bridged Local Area Networks, Amendment 4: Provider Bridges", IEEE Computer Society, May 26, 2006, 73 pages.

IEEE P802.1ah/D3.4, "Draft Standard for Local and Metropolitan Area Networks, Virtual Bridged Local Area Networks, Amendment 6: Provider Backbone Bridges", IEEE Computer Society, Mar. 10, 2007, 195 pages.

IEEE, 802.1Qay/D3.0, "Virtual Bridged Local Area Networks—Amendment: Provider Backbone Bridge Traffic Engineering", IEEE Computer Society, Apr. 18, 2008, 144 pages.

IEEE P802.1ag/D8, "Draft Standard for Local and Metropolitan Area Networks, Virtual Bridged Local Area Networks—Amendment 5: Connectivity Fault Management", IEEE Computer Society, Feb. 8, 2007, 248 pages.

International Telecommunication Union, ITU-T, G.7712/Y.1703, Telecommunication Standardization Sector of ITU, "Series G: Transmission Systems and Media, Digital Systems and Networks, Digital Terminal Equipments—Operations, Administration and Maintenance Features of Transmission Equipment, Series Y: Global Information Infrastructure and Internet Protocol Aspects", Mar. 2003, 78 pages.

Sultan, Robert, et al., "Method of Detecting Transport Leaks in Hybrid Switching Networks", filed on Mar. 27, 2007 as U.S. Appl. No. 11/691,558.

Sultan, Robert, et al., "Method of Preventing Transport Leaks in Hybrid Switching Networks by Extension of the Link Layer Discovery Protocol (LLDP)", filed on Mar. 27, 2008 as U.S. Appl. No. 12/057,190.

Sultan, Robert, et al., "Fault Verification for an Unpaired Unidirectional Switched-Path", filed on Mar. 27, 2008 as U.S. Appl. No. 12/056,405.

Sultan, Robert, et al., "Data Communications Network for the Management of an Ethernet Transport Network", filed on Mar. 28, 2008 as U.S. Appl. No. 12/057,426.

Foreign communication from a related counterpart application—International Search Report and Written Opinion, PCT/CN2008/070779, Jul. 31, 2008, 7 pages.

IEEE P802.1ah/D4.2, "Draft Standard for Local and Metropolitan Area Networks, Virtual Bridged Local Area Networks, Amendment 6: Provider Backbone Bridges", IEEE Computer Society, Mar. 26, 2008, 116 pages.

IEEE Standard, 802.1D™, "IEEE Standard for Local and Metropolitan Area Networks, Media Access Control (MAC) Bridges", IEEE Computer Society, Jun. 9, 2004, 260 pages.

IEEE Standard, 802.1Q™, "IEEE Standard for Local and Metropolitan Area Networks, Virtual Bridged Local Area Networks", IEEE Computer Society, May 19, 2006, 301 pages.

IEEE Standard, 802.1ag™, "IEEE Standard for Local and Metropolitan Area Networks, Virtual Bridged Local Area Networks, Amendment 5: Connectivity Fault Management", IEEE Computer Society, Dec. 17, 2007, 260 pages.

IEEE P802.1AX™/D2.1, "Draft Standard for Local and Metropolitan Area Networks Link Aggregation", IEEE Computer Society, Feb. 23, 2008, 155 pages.

Foreign Communication From a Related Counterpart Application—International Preliminary Report on Patentability, PCT/CN2008/070779, Dated Oct. 27, 2009; 5 pages.

Foreign communication from a related counterpart application—International Search Report and Written Opinion, PCT/CN2008/070773, Jul. 31, 2008, 9 pages.

Foreign Communication From a Related Counterpart Application—International Preliminary Report on Patentability, PCT/CN2008/070773, Oct. 27, 2009; 7 pages.

Office Action Dated Oct. 30, 2009, U.S. Appl. No. 12/056,405, 28 pages.

Office Action Dated Apr. 27, 2010, U.S. Appl. No. 12/056,405, 23 pages.

Office Action Dated Oct. 6, 2009, U.S. Appl. No. 12/057,426, 16 pages.

Office Action Dated Feb. 22, 2010, U.S. Appl. No. 12/057,426 23 pages.

Sultan, Robert, et al., Provisional Patent Application entitled "System for Connectivity Fault Management in Networks Supporting Both Connectionless and Connection-Oriented Traffic," filed Apr. 27, 2007, U.S. Appl. No. 60/914,432.

Office Action Dated Sep. 15, 2010, U.S. Appl. No. 12/056,405, 35 pages.

Office Action Dated Jul. 21, 2010, U.S. Appl. No. 12/057,426, 23 pages.

Office Action Dated Dec. 7, 2010, U.S. Appl. No. 12/057,426, 23 pages.

Notice of Allowance Dated May 6, 2011, U.S. Appl. No. 12/057,426, 5 pages.

* cited by examiner

VERIFYING MANAGEMENT VIRTUAL LOCAL AREA NETWORK IDENTIFIER PROVISIONING CONSISTENCY

CROSS-REFERENCE TO RELATED APPLICATIONS

The present application claims priority to U.S. Provisional Patent Application Ser. No. 60/914,432 filed Apr. 27, 2007 by Sultan et al. and entitled "System for Connectivity Fault Management in Networks Supporting Both Connectionless and Connection-Oriented Traffic." The present application also claims priority to U.S. Provisional Patent Application Ser. No. 60/970,428 filed Sep. 6, 2007 by Sultan et al. and entitled "Data Communications Network for the Management of an Ethernet Transport Network." The present application also claims priority to U.S. Provisional Patent Application Ser. No. 61/016,332 filed Dec. 21, 2007 by Sultan et al. and entitled "Method of Verifying DCN VID Provisioning Consistency." These provisional applications are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks are comprised of nodes that transport data through the network. The nodes may include routers, switches, and/or bridges that transport the individual data frames and/or packets through the network. Some networks support both connectionless frame transfer (e.g., Provider Backbone Bridging (PBB)) and connection-oriented frame transfer (e.g., PBB Traffic Engineering (PBB-TE)). Providing management services (e.g., Data Communication Network services and/or connectivity fault management) in such networks is desirable. Further, ensuring that management services function properly in such networks is desirable.

SUMMARY

In a first aspect, the disclosure includes a communications network, comprising a plurality of nodes supporting connection-oriented traffic and connectionless traffic, wherein management traffic between the nodes is propagated as connectionless traffic having a unique Management Virtual Local Area Network (VLAN) Identifier (VID), and wherein at least one node is configured to perform a Link Layer Discovery Protocol (LLDP) exchange operation to enable detection of inconsistent provisioning of the Management VID in at least one node.

In a second aspect, the disclosure includes a communications network component, comprising logic that enables connection-oriented traffic and VLAN-based connectionless traffic, wherein the logic propagates management messages as VLAN-based connectionless traffic having a management VID and wherein the logic enables detection of inconsistent management VIDs in a network.

In a third aspect, the disclosure includes a communications network component comprising at least one processor configured to implement a method comprising supporting connection-oriented traffic and VLAN-based connectionless traffic associated with a management VID, and transmitting a management VID type, length, value (TLV) data unit.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

At least some embodiments of the disclosure involve management traffic in a hybrid network environment that supports connection-oriented traffic and connectionless traffic (e.g., traffic based on VLANs). For example, connection-oriented frame transfers may be based on PBB-TE and connectionless frame transfers may be based on PBB.

In accordance with some embodiments, management traffic is propagated as connectionless traffic associated with a Management VLAN, identified by a Management VID. In an Ethernet embodiment, the Management VID may be a VID that is temporarily provisioned or globally reserved for management traffic. The management traffic may correspond to Connectivity Fault Management (CFM) messages, Operation, Administration, Management, and Provisioning (OAM&P) messages, configuration and backup files, billing data, software downloads, or other management traffic. To verify the Management VID is provisioned identically throughout the network, embodiments support exchanging Management VID information between adjacent nodes. For example, a node may exchange a LLDPDU with each neighboring node. In some embodiments, the LLDPDU is formatted according to the IEEE 802.1AB protocol (LLDP). By broadcasting Management VID information, discrepancies in Management VID provisioning and/or Management VID values can be detected and flagged. As desired, Management VID provisioning can be corrected and/or updated to support the propagation of management traffic in a network.

Figure 1:
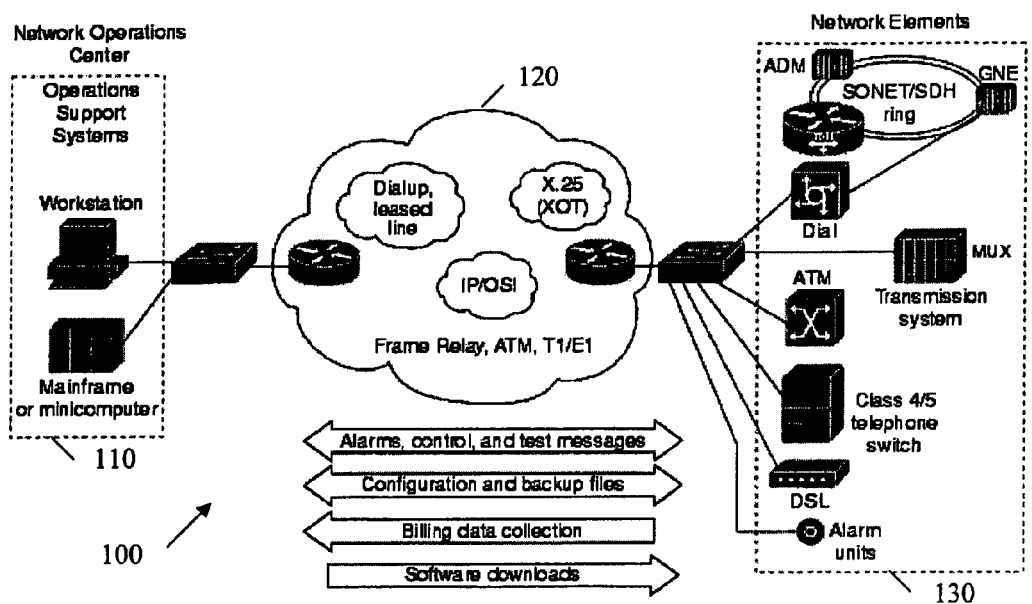
FIG. 1 is a block diagram of a system with a Data Communications Network (DCN).

FIG. 1 is a block diagram of an embodiment of a system 100 with a DCN 120. FIG. 1 is provided to better understand the use of the term DCN in the disclosure. In FIG. 1, a telecommunications service provider may deploy network elements 130 such as Synchronous Optical Network (SONET) or Synchronous Digital Hierarchy (SDH) components. The DCN 120 is deployed to support management connectivity between an Operations Support System (OSS) 110 and individual network elements 130, which comprise a Transport Network. The DCN 120 (e.g., International Telecommunication Union Standardization Sector (ITU-T) G.7712/Y.1703) makes it unnecessary to provide direct connections between the OSS 110 and each individual network element 130 of the transport network. The DCN 120 requires the deployment of a routing protocol such as Open Systems Interconnect (OSI) routing or Internet Protocol (IP) routing in the network elements 130. Information carried by the DCN 120 includes OAM&P messages, configuration and backup files, billing data, and software downloads.

In at least some embodiments, an instance of a bridged VLAN, known as a Management VLAN, supports connectivity between a Network Management System (NMS) and the bridging devices associated with an Ethernet Transport Network (Institute of Electrical and Electronic Engineers (IEEE) Draft Std. 802.1Qay). The role of the VLAN with respect to the Ethernet Transport network is similar to the role of the DCN (ITU-T G.7712/Y.1703) 120 in a traditional (e.g., SONET/SDH) telecommunications network. The VLAN used for this purpose may be called an Ethernet DCN.

Embodiments provide an efficient method of interconnecting a NMS with Ethernet Transport Devices (802.1Qay compliant bridges) because it is unnecessary to provide a direct connection between the NMS and each individual Ethernet Transport Device. This is similar to the efficiency provided by a DCN in a SONET network. A particular advantage of using a VLAN for this purpose is that the 802.1 Qay bridge natively supports VLANs. This makes it unnecessary to introduce additional protocols to the 802.1 Qay bridge in order to support the DCN function.

Figure 2:
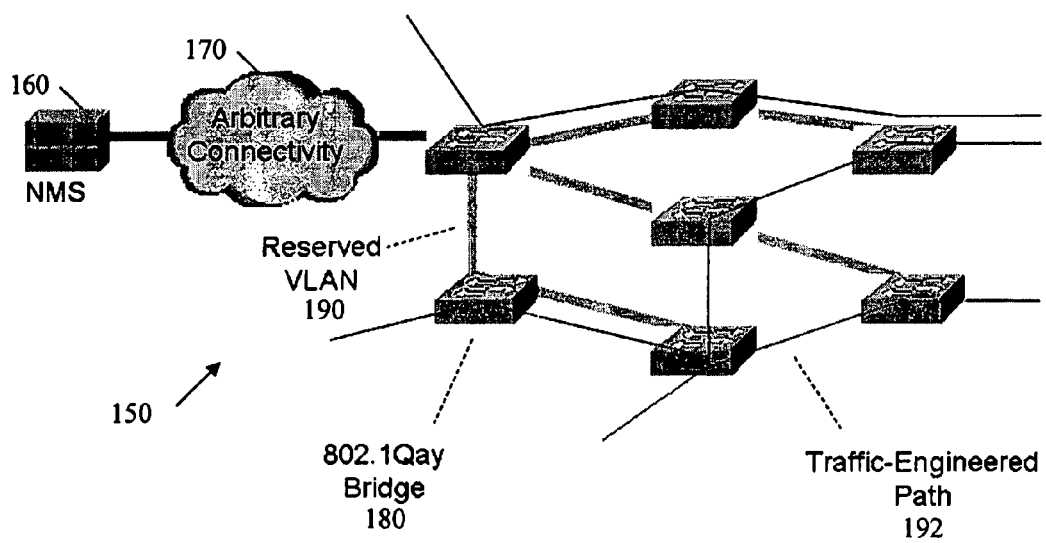
FIG. 2 is a block diagram of an embodiment of an Ethernet Transport Network (ETN) managed via an Ethernet DCN.

FIG. 2 is a block diagram of an embodiment of an ETN 150 managed using a reserved VLAN 190 that acts as an Ethernet DCN. In at least some embodiments, the ETN 150 follows the IEEE Draft Std. 802.1Qay protocol, which specifies the means by which 802.1Qay bridges 180 may be used to support traffic-engineered paths. A network deploying such paths can transport data in a manner similar to a SONET or SDH network. In FIG. 2, the ETN 150 is managed by a NMS 160 in a manner similar to the way in which a SONET-based transport network is managed by the OSS 110. As in the case of the SONET-based transport network, it is useful to avoid the direct interconnection between the NMS 160 and each bridge 180 within the ETN 150. It is observed that the 802.1 Qay-compliant bridges 180 can concurrently support instances of VLANs and instances of traffic-engineered paths 192. In FIG. 2, DCN-type services in the ETN 150 are provided using the reserved VLAN 190, which interconnects the NMS 160 with ETN devices 180. In this manner, direct connection of the NMS 160 with each individual device 180 is unnecessary and an additional network technology need not be introduced to support the Ethernet DCN. This can be contrasted with the use of a traditional DCN 120 that requires the introduction of a layer three protocol, such as OSI routing or IP routing, in the network elements 130.

In general, the reserved VLAN 190 of the ETN 150 can be used to carry the same types of information as the traditional DCN, which includes OAM&P (such as alarm, control, and test messages), configuration and backup files, billing data, and software download. In addition, the reserved VLAN 190 is useful in carrying CFM information related to traffic-engineered Ethernet paths. For additional information regarding CFM services in hybrid communication networks, reference is made to U.S. patent application Ser. No. 12/056,405 filed Mar. 27, 2008 by Sultan et al. and entitled "Fault Verification for an Unpaired Unidirectional Switched-Path" and to U.S. Provisional Patent Application Ser. No. 60/914,432 filed Apr. 27, 2007 by Sultan, et al. and entitled "System for Performing Connectivity Fault Management in Networks Supporting Both Connectionless and Connection-Oriented Traffic", which are herein incorporated by reference as if reproduced in their entirety.

The reserved or provisioned DCN VLAN 190 enables connectivity among all nodes/bridges in the entire ETN 150. The PBB-TE protocol requires all network connectivity paths to be explicitly created (instead of spanning tree). For a network with only PBB-TE paths, intermediate nodes along each PBB-TE paths cannot reach each other. By creating an Ethernet DCN, all the nodes/bridges in the PBB-TE network are ensured to be reachable from any specific node. In such case, various management functions can be supported. For example, the Ethernet DCN can support remote access from any PBB-TE nodes to other PBB-TE nodes. In this manner, an operator at one location can remotely login to another node to perform OAM&P functions. Additionally or alternatively, the reserved VLAN 190 supports segment connectivity testing or other diagnostic operations. As an example, any intermediate node can test its connectivity to other nodes along ESP paths. Using such connectivity testing faults can be isolated along any PBB-TE segment.

In accordance with some embodiments, the reserved or provisioned DCN VLAN 190 is associated with a management VID. To ensure consistent provisioning of the management VID to the devices 180 of the ETN 150, each device 180 is configured to exchange management VID information with neighboring devices. For example, an LLDPDU containing a Management VID TLV field specifying the locally provisioned management VID can be exchanged by each device 180 with its neighbor. In other words, each given device 180 may disclose to its neighbor devices whether a management VID has been provisioned to the given device and, if so, the value of the management VID. In this manner, any discrepancies in management VID provisioning can be detected and resolved.

In at least some embodiments, network nodes maintain configuration information in the form of management information bases (MIBs) that are typically accessible via Simple Network Management Protocol (SNMP). By enabling devices in a network to become aware of the configuration information for other nodes, provisioning or misconfiguration problems can be detected and resolved. The exchange of configuration information between neighboring bridges of a network is defined by IEEE 802.1AB, the LLDP. This protocol is intended to detect inconsistencies in provisioning, but does not currently specify the exchange of management VID values. Thus, at least some embodiments involve extending IEEE 802.1AB to include a TLV format that supports advertising management VID values between nodes of a network.

Figure 3A:
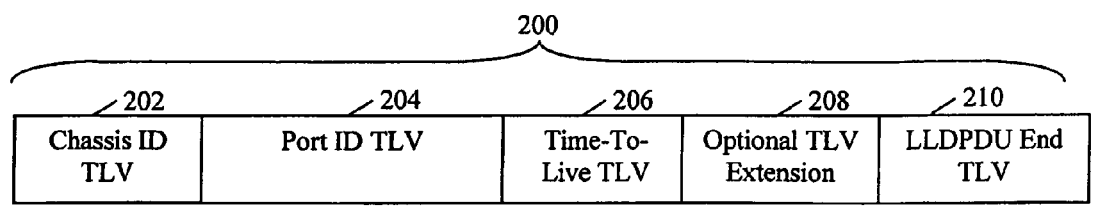
FIG. 3A shows an embodiment of a LLDP Data Unit (LLDPDU).

FIG. 3A shows an embodiment of an LLDPDU 200. The LLDPDU 200 comprises mandatory TLVs including a Chassis ID TLV 202, a Port ID TLV 204, a Time-To-Live (TTL) TLV 206, and an LLDPDU End TLV 210. The Chassis ID TLV 202 identifies the sender (e.g., the bridge MAC address of the sender). The Port ID TLV 204 identifies the port from which the LLDPDU 200 is transmitted. The TTL TLV 206 indicates how long (e.g., in seconds) the information in the LLDPDU 200 is to be treated as valid information. The LLDPDU End TLV 210 indicates the end of TLVs in the LLDPDU 200.

Figure 3B:
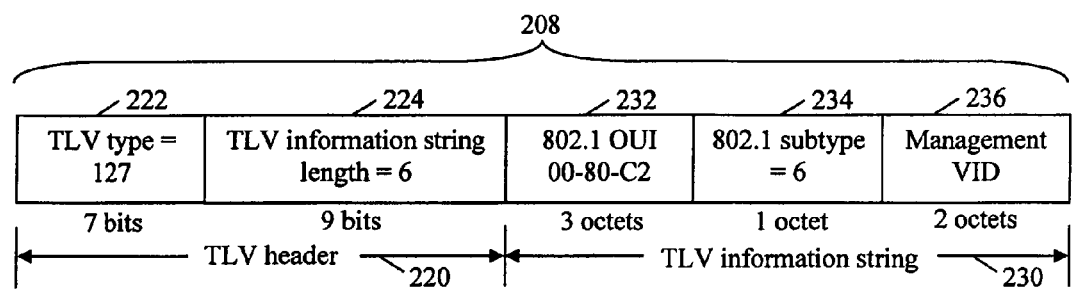
FIG. 3B shows an embodiment of management VID TLV extension for an LLDPDU.

The LLDPDU 200 has an extensible format that supports optional TLV extensions 208. In accordance with embodiments, such a TLV extension 208 corresponds to a management VID TLV. FIG. 3B shows an embodiment of a management VID TLV 208 for the LLDPDU format. As shown in FIG. 3B, the management VID TLV 208 comprises a TLV header 220 and a TLV information string 230. The TLV header 220 includes an extension type field 222 for identifying TLV extensions, which may be about seven bits in length. The TLV header 220 also includes a TLV information string length field 224 that indicates the length of the TLV information string 230, and which may be about nine bits in length. For the management VID TLV embodiment shown in FIG. 3B, the TLV information string has a length of about six octets.

Octets 1-3 of the TLV information string 230 correspond to an Organizationally Unique Identifier (OUI) field 232 that identifies the OUI associated with each management VID TLV. Octet 4 of the TLV information string 230 corresponds to an 802.1 sub-type field 234 (e.g., subtype 6) associated with management VID TLVs. Finally, octets 5-6 of the TLV information string 230 correspond to a management VID field 236 that contains a management VID value. As an example, if a management VID has not been provisioned to a node, management VID TLVs transmitted from that node contain a zero value or null value in the management VID field 236. If a management VID has been provisioned to a node, management VID TLVs transmitted from that node contain the value of the provisioned management VID in the management VID field 236. By advertising the management VIDs between nodes of a network, inconsistencies in the provisioning of management VIDs can be detected. Such inconsistencies could result in the failure of management connectivity to nodes and resulting failure to control the nodes.

For more information on extending IEEE 802.1AB to support new TLV extensions, reference is made to U.S. patent application Ser. No. 12/057,190 filed Mar. 27, 2008 by Sultan et al. and entitled "Method of Preventing Transport Leaks and VLAN Usage Conflicts in Hybrid Switching Networks by Extension of the Link Layer Discovery Protocol (LLDP)." This reference is incorporated herein by reference as if reproduced in its entirety.

Figure 3C:
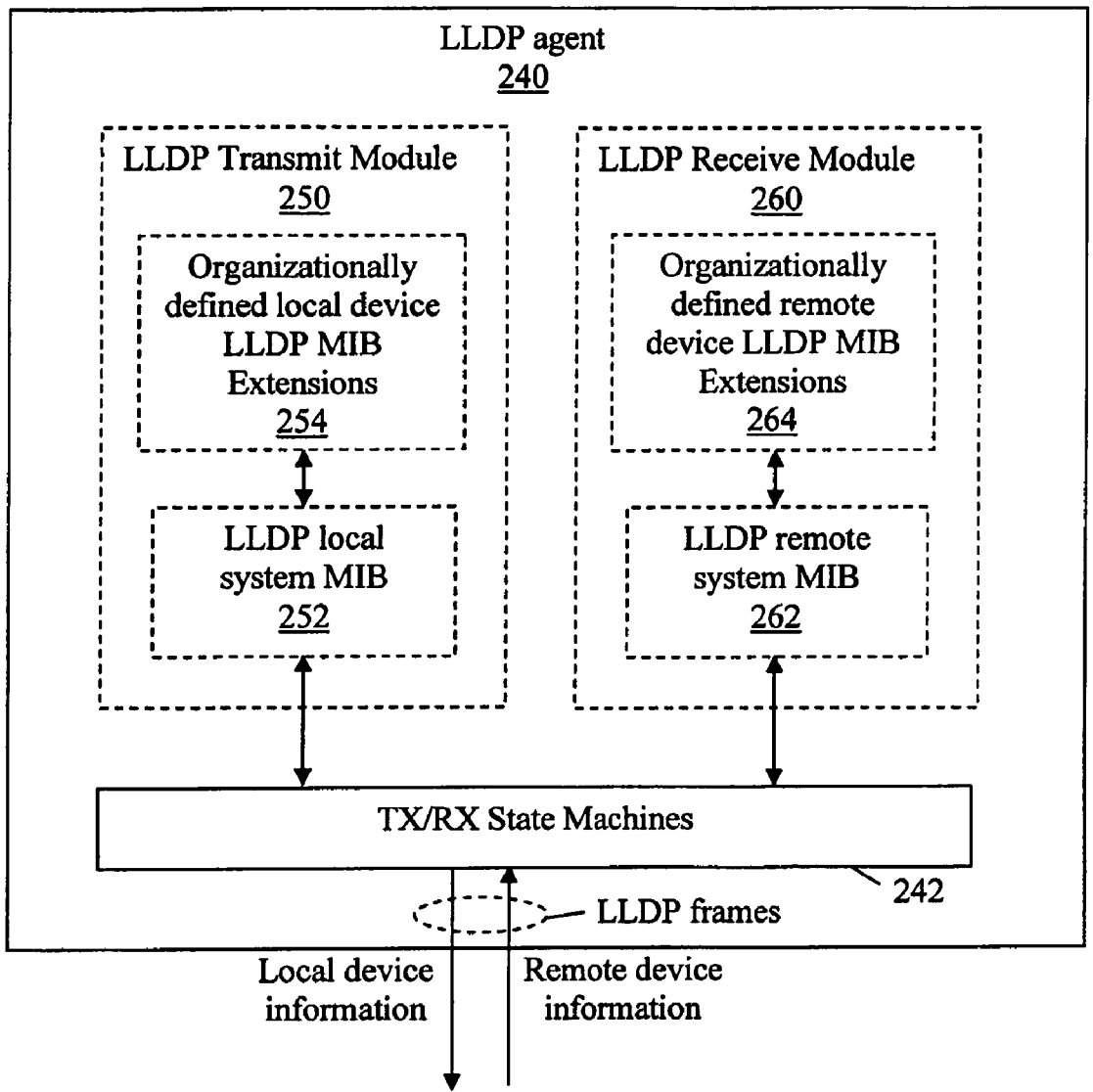
FIG. 3C shows an embodiment of an LLDP agent.

The IEEE 802.1AB Link Layer Discovery Protocol enables Ethernet devices to advertise information about themselves to neighboring network nodes as well as to store advertised information received from other neighboring network nodes. FIG. 3C shows an embodiment of an LLDP agent 240 that supports LLDP. As is understood in the relevant art, LLDP operates in a one-way direction. In other words, LLDPDUs are not exchanged as information requests by one device and responses sent by another device. Thus, a receiving device does not acknowledge LLDP information received from other devices. Rather, the receiving device stores and updates LLDP information, which is accessible to network administrators.

In accordance with embodiments, various nodes of a network can implement at least one LLDP agent 240. As shown, each LLDP agent 240 comprises an LLDP transmit module 250 and an LLDP receive module 260. The LLDP transmit module 250 comprises an LLDP local system MIB 252 that stores the local system information (the local system refers to the node that implements the LLDP agent 240), which is to be transmitted by the LLDP agent 240. The LLDP transmit module 250 also comprises an organizationally defined local device LLDP MIB extension 254 to support transmissions of organization specific information for the local node in the form of TLVs.

Similarly, the LLDP receive module 260 comprises an LLDP remote system MIB 262 to maintain any remote system information received by the LLDP agent 240 from other nodes in a network. The LLDP receive module 260 also comprises an organizationally defined remote device LLDP MIB extension 264 to maintain organization specific information received from remote systems. In accordance with LLDP, the transmit (TX) and receive (RX) functions of the LLDP agent 240 can be controlled by state machines 242. In at least some embodiments, the information stored in the LLDP transmit module 250 and the LLDP receive module 260 can be accessed and retrieved via the SNMP.

To support transmission and reception of management VID information, the LLDP agent 240 can implement various features. For example, in some embodiments, LLDP agent 240 stores a table that controls the selection of LLPD management VID TLVs to be transmitted on individual ports. In addition, the LLDP agent 240 stores configuration information that specifies the set of ports on which a local system transmits management VIDs. The configuration information is restored from non-volatile storage upon re-initialization of a network's management system. Thus, each node that implements a LLDP agent 240 either comprises or has access to non-volatile memory from which such configuration information can be restored. In addition, the LLDP agent 240 stores a truth value that determines whether a management VID TLV transmission is allowed on a given node port (e.g., an LLDP transmission capable port). The truth value is restored from non-volatile storage upon re-initialization of a network's management system. Thus, each node that implements a LLDP agent 240 either comprises or has access to non-volatile memory from which such truth values can be restored.

The LLDP agent 240 can be configured to operate in various modes. For example, in a transmit-only mode, the LLDP agent 240 can only transmit information regarding the capabilities and the current status of the local node. In other words, the LLDP transmit module 250 is active and the LLDP receive module 260 is inactive. In a receive-only mode, the LLDP agent 240 can only receive information about the capabilities and the current status of remote systems. In other words, the LLDP transmit module 250 is inactive and the LLDP receive module 260 is active. In a transmit/receive mode, the LLDP agent 240 can transmit the local system capabilities and status information as well as receive remote system's capabilities and status information. In other words, both the LLDP transmit module 250 and the LLDP receive module 260 are active.

When active, the LLDP transmit module 250 transmits the local system's information at regular intervals using appropriate TLVs. When inactive, the LLDP transmit module 250 transmits LLDPDUs with a TTL TLV containing a zero value or null value in the information field. Upon receiving such an LLDPDU, remote systems can remove the information associated with the device that transmitted the LLDPDU from their MIBs 262.

When active, the LLDP receive module 260 receives information from remote systems and updates the remote system LLDP MIB 262. When new information or updated information is received, the LLDP receive module 260 initiates a timer to track the "valid duration" indicated by the TTL TLV in each received LLDPDU. Once a timer expires, the information related to the timer is removed from the remote system LLDP MIB 262. Alternatively, if the LLDP receive module 260 receives an LLDPDU with a TTL TLV containing a zero value or null value, the information related to the LLDPDU can be removed from the remote system LLDP MIB 262. The protocol for storing and deleting information can be adjusted as desired in accordance with the amount of storage space provided for the MIBs 252 and 262.

Figure 3D:
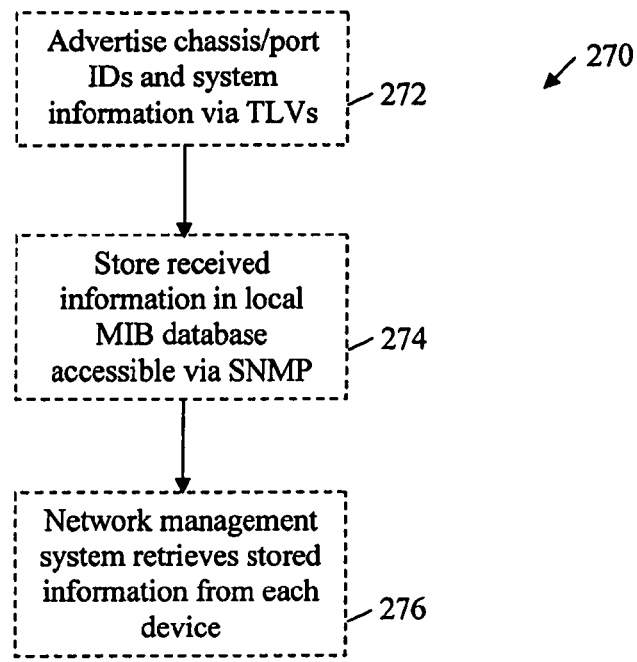
FIG. 3D shows an embodiment of an LLDP method.

FIG. 3D shows an embodiment of an LLDP method 270. As shown, the method 270 comprises advertising chassis/port IDs and system information via TLVs (block 272). In accordance with embodiments, management VID TLVs are advertised as part of the system information in block 272. Received information is stored in local MIB databases accessible via SNMP (block 274). Finally, the network management system retrieves stored information from each device (block 276). By advertising, storing and accessing management VID information in the manner described for the method 270, inconsistencies in the provisioning of management VIDs can be detected.

Figure 4:
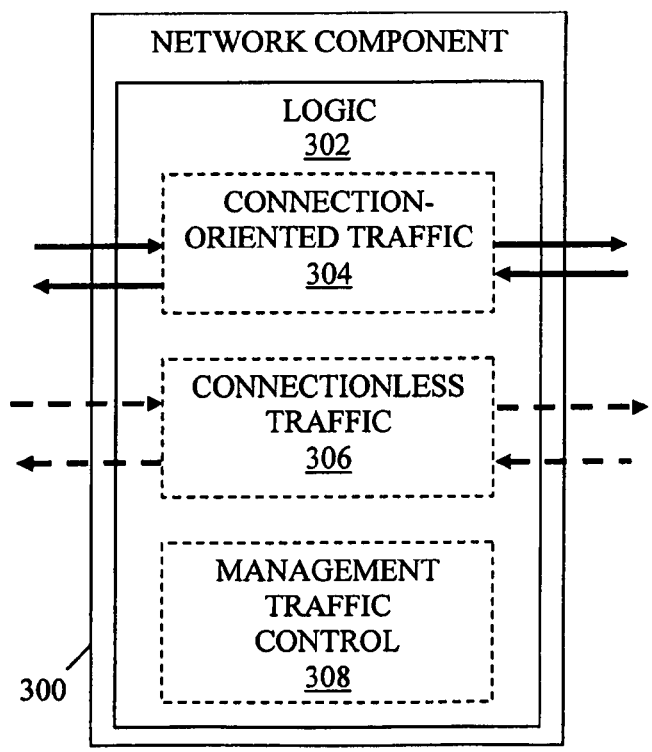
FIG. 4 is a block diagram of an embodiment of a network component.

FIG. 4 is a block diagram of an embodiment of a network component 300. In FIG. 4, the network component 300 comprises logic 302 that supports various functions. The logic 302 may be representative of hardware, firmware, and/or software modules as understood by those of skill in the art. As shown, the logic 302 comprises a connection-oriented traffic module 304 that supports connection-oriented communications (represented by the solid arrows). The logic 302 also comprises a connectionless traffic module 306 that supports VLAN-based communications (represented by the dashed arrows). Finally, the logic 302 comprises a management traffic control module 308 that enables the network component 300 to generate and/or to handle management traffic associated with a particular VLAN.

For example, in some embodiments, the management traffic control module 308 enables the network component 300 to generate a CFM message that is propagated as connectionless traffic. Additionally or alternatively, the management traffic control module 308 enables the network component 300 to generate OAM&P messages, configuration and backup files, billing data, software downloads, or other management traffic as connectionless traffic. Additionally or alternatively, the management traffic control module 308 enables the network component 300 to respond to incoming management traffic. Regardless of the management traffic type and/or source, a management VID is associated with the management traffic. The management VID corresponds to the reserved or provisioned Management VLAN 250 and Ethernet DCN discussed previously with respect to FIG. 2. The management VID may be temporarily provisioned or globally reserved.

The management traffic control module 308 also generates and/or handles management VID provisioning and management VID TLVs as described herein. In some embodiments, the management traffic control module 308 may generate management VID TLVs based on the TLV format and LLDP agent described previously in FIGS. 3A-3D. For example, if a management VID has not been provisioned to the network component 300, the management traffic control module 308 places a zero or null value in the management VID field of a management VID TLV. If a management VID has been provisioned to the network component 300, the management traffic control module 308 places the value of the provisioned management VID in the management VID field of a management VID TLV. The management traffic control module 308 also may support various features such as the table, the configuration data, and the truth values described for FIG. 3C.

Figure 5:
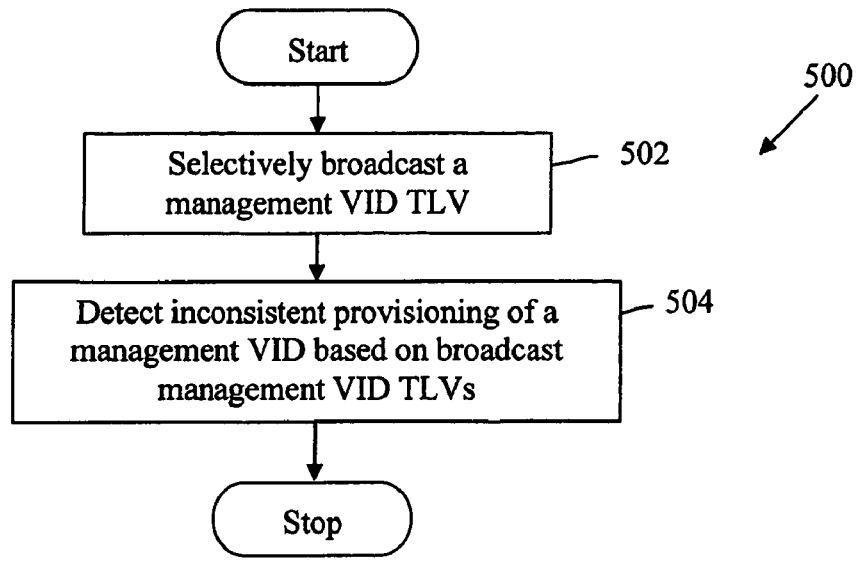
FIG. 5 is a flowchart of an embodiment of a management method.

FIG. 5 is a flowchart of an embodiment of a management method 500. As shown, the method 500 starts by sending a management VID TLV (block 502) to each active neighbor. The management VID TLV conveys information such as whether a management VID has been provisioned to the node broadcasting the TLV and, if so, the value of the management VID. At block 504, inconsistent provisioning of management VID is detected based on broadcast management VID TLVs. Steps 502 and 504 can be performed by a single device or by multiple devices of a communications network.

Figure 6:
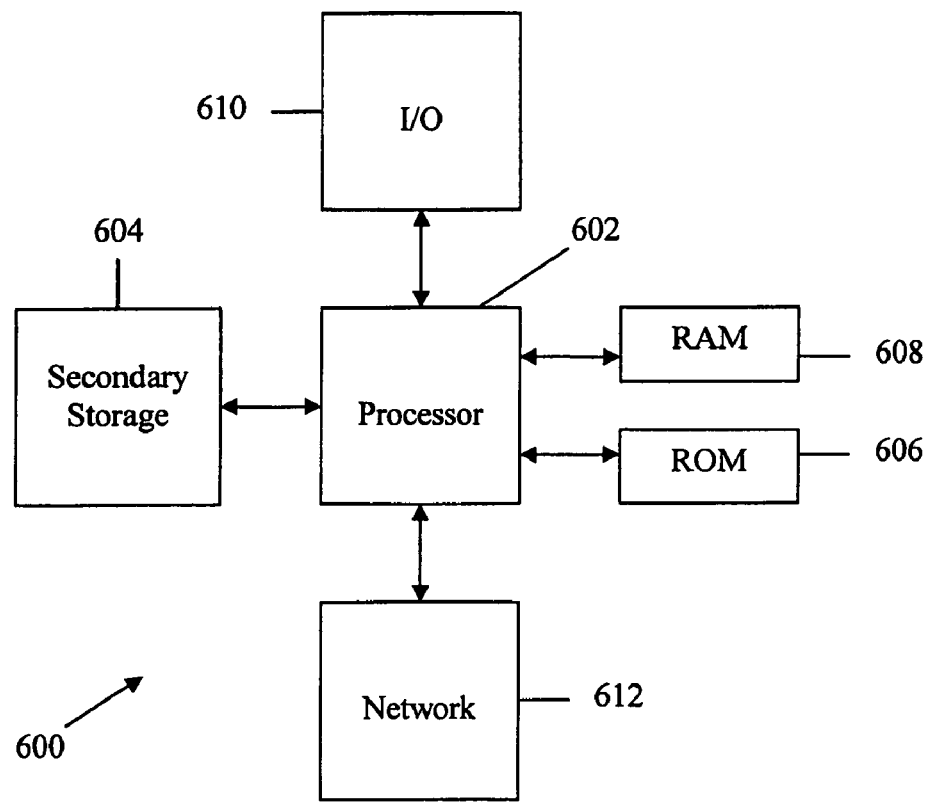
FIG. 6 is a block diagram of an embodiment of a general-purpose network component.

The components and methods described above may be implemented on any general-purpose network component, such as a computer, router, switch, or bridge, with sufficient processing power, memory resources, and network throughput capability to handle the necessary workload placed upon it. FIG. 6 illustrates a typical, general-purpose network component suitable for implementing one or more embodiments of a node disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor may be implemented as one or more CPU chips.

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A communications network, comprising:
a plurality of nodes supporting connection-oriented traffic and connectionless traffic or only connectionless traffic, wherein management traffic between the nodes is propagated as connectionless traffic having a unique Management Virtual Local Area Network (VLAN) Identifier (VID), and
wherein at least one of the nodes supporting connection-oriented traffic and connectionless traffic or only connectionless traffic is configured to perform a Link Layer Discovery Protocol (LLDP) exchange operation to enable detection of inconsistent provisioning of the Management VID in at least one node.

2. The communications network of claim 1, wherein the Management VID exchange operation comprises transmitting a packet that identifies whether the Management VID has been provisioned to a node.

3. The communications network of claim 1, wherein the Management VID exchange operation comprises transmitting a packet that identifies a Management VID value provisioned to a node.

4. The communications network of claim 1, wherein at least one node stores a table that controls selection of the Management VID value exchanged with neighboring nodes, 5. The communications network of claim 1, wherein at least one node stores configuration information that specifies node ports on which LLDP data units (LLDPDUs) containing Management VID type, length, values (TLVs) will be transmitted, and wherein the configuration information is restored from a non-volatile memory upon re-initialization of a management system for the communications network.

6. The communications network of claim 1, wherein at least one node stores a truth value that determines whether LLDP exchange of Management VID is allowed for a particular node port, and wherein at least one truth value is restored from a non-volatile memory upon re-initialization of a management system for the communications network.

7. The communications network of claim 1, wherein the Management VID is temporarily provisioned.

8. The communications network of claim 1, wherein the Management VID is globally reserved.

9. A communications network component, comprising:
logic tangibly embodied on hardware that enables connection-oriented traffic and Virtual Local Area Network (VLAN)-based connectionless traffic or only VLAN-based connectionless traffic,
wherein the logic propagates management messages as VLAN-based connectionless traffic having a management VLAN identifier (VID),
wherein the logic enables detection of inconsistent management VIDs in a network using a management VID type, length, value (TLV) data unit, and
wherein the management VID TLV data unit comprises a 7 bit TLV type, a 9 bit TLV information string length, a 3 octet Organizationally Unique Identifier (OUI), a 1 octet 802.1 subtype, and a 2 octet management VID field.

10. The communications network component of claim 9, wherein the management VID TLV comprises an IEEE 802.1 subtype field associated with management VIDs.

11. The communications network component of claim 9, wherein the TLV type is 127, the TLV information string length is 6, the OUI is 00-80-C2, and the 802.1 subtype is 6.

12. The communications network component of claim 11, wherein the logic transmits a management VID TLV having a zero value in the management VID field if a management VID has not been provisioned to the communications network component.

13. The communications network component of claim 11 wherein the logic transmits a management VID TLV having the provisioned management VID's value in the management VID field if a management VID has been provisioned to the communications network component.

14. The communications network component of claim 9, wherein the logic stores a table that controls selection of management VID TLVs to be transmitted on individual node ports.

15. The communications network component of claim 9, wherein the logic stores configuration information that specifies node ports on which management VID TLVs will be transmitted, and wherein the configuration information is restored from a non-volatile memory upon re-initialization of a management system for the communications network component.

16. The communications network component of claim 9, wherein at least one node stores a truth value that determines whether management VID TLV transmissions are allowed for a particular node port, and wherein at least one truth value is restored from a non-volatile memory upon re-initialization of a management system for the communications network component.

17. A communications network component comprising at least one hardware processor configured to:
support connection-oriented traffic and virtual local area network (VLAN)-based connectionless traffic associated with a management VLAN identifier (VID); and
transmit a management VID type, length, value (TLV) data unit,
wherein the management VID TLV data unit comprises an Institute of Electrical and Electronics (IEEE) 802.1 subtype field and a Management VID value field,
wherein the IEEE 802.1 subtype field identifies the management VID TLV data unit as comprising a management VID type TLV.

18. The communications network component of claim 17, wherein the processor is further configured to receive a second management VID TLV data unit.

19. The communications network component of claim 18, wherein the processor is further configured to detect inconsistent provisioning of the management VID using information in the second management VID TLV data unit.

20. The communications network component of claim 17, wherein the management VID TLV data unit further comprises a 7 bit TLV type, a 9 bit TLV information string length, and a 3 octet Organizationally Unique Identifier (OUI).

21. An apparatus comprising:
a hardware system that supports the provisioning of a virtual local area network (VLAN) identifier (VID) identifying a VLAN on which bridge management traffic is to be carried,
wherein the information carried in a management VID type length value (TLV) allows detection of inconsistent configuration of a management VID,
wherein the management VID TLV allows an IEEE 802.1Q-compatible IEEE 802 local area network (LAN) station to advertise the value of the management VID associated with the system, and
wherein the management VID TLV comprises:
a two-octet TLV header comprising: a seven-bit TLV type that is set to 127; and subsequently, a nine-bit TLV information string length that is set to six; and subsequently, a six octet TLV information string comprising: a three-octet 802.1 Organizationally Unique Identifier (OUI) that is set to 00-80-C2; subsequently, a one-octet 802.1 subtype that is set to six; and subsequently, the management VID.

22. The communications network component of claim 17, wherein the IEEE 802.1 subtype field is set equal to 06.

23. The communications network component of claim 17, wherein the Management VID value field comprises a management VID that has been provisioned to the communications network component.

\* \* \* \* \*